United States Patent
Gowdar et al.

(10) Patent No.: US 10,256,925 B2
(45) Date of Patent: Apr. 9, 2019

(54) METHODS AND WIRELESS COMMUNICATION SYSTEMS FOR WIRELESS RE-CALIBRATION OF RF COMPONENTS OF COMMUNICATION DEVICES

(71) Applicant: Samsung Electronics Co., Ltd., Suwon-si, Gyeonggi-do (KR)

(72) Inventors: Adithya Gowdar, Bangalore (IN); Prasad R. Rao, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/635,771

(22) Filed: Jun. 28, 2017

(65) Prior Publication Data
US 2018/0205468 A1    Jul. 19, 2018

(30) Foreign Application Priority Data
Jan. 19, 2017  (IN) .............................. 201741002177

(51) Int. Cl.
*H04B 17/21* (2015.01)
*H04B 17/11* (2015.01)
*H04B 17/14* (2015.01)

(52) U.S. Cl.
CPC ............ *H04B 17/21* (2015.01); *H04B 17/11* (2015.01); *H04B 17/14* (2015.01)

(58) Field of Classification Search
CPC ......... H04B 17/11; H04B 17/21; H04B 17/14

USPC ...................................................... 455/67.11
See application file for complete search history.

(56) References Cited

U.S. PATENT DOCUMENTS

| | | | | |
|---|---|---|---|---|
| 5,450,617 A | * | 9/1995 | Moore | H04W 84/00 455/522 |
| 2002/0187763 A1 | * | 12/2002 | Lim | H03L 7/085 455/165.1 |
| 2009/0047918 A1 | * | 2/2009 | Tai | G01R 29/0871 455/130 |
| 2014/0065975 A1 | * | 3/2014 | Schmidt | H04W 16/14 455/67.11 |
| 2015/0052969 A1 | | 2/2015 | Jenkins | |

\* cited by examiner

*Primary Examiner* — Eugene Yun
(74) *Attorney, Agent, or Firm* — Harness, Dickey & Pierce, P.L.C.

(57) ABSTRACT

Methods and systems for wireless re-calibration of Radio Frequency (RF) components of a communication device are described. Methods includes monitoring a current value of at least one parameter of at least one RF component of the communication device and communicating the current value to a calibration server on detection of an event related to the at least one parameter. The current value is analyzed by the calibration server to determine a calibration value, wherein the calibration server maybe configured to communicate the calibration value to the communication device. Further, the methods includes receiving the calibration value for at least one parameter from the calibration server for initiating a re-calibration procedure and re-calibrating the current value of the at least one parameter to the calibration value in accordance with the recalibration procedure. The method improves RF device performance in spite of device aging and environmental factors.

20 Claims, 10 Drawing Sheets

METHODS AND WIRELESS COMMUNICATION SYSTEMS FOR WIRELESS RE-CALIBRATION OF RF COMPONENTS OF COMMUNICATION DEVICES

PRIORITY

This application claims priority under 35 U.S.C. § 119(a) to Indian Complete Patent Application Serial No. 201741002177 (CS), which was filed on Jan. 19, 2017 in the Indian Intellectual Property Office, the entire disclosure of which is incorporated herein by reference.

TECHNICAL FIELD

Example embodiments herein generally relate to the field of wireless communication systems and more particularly to Radio Frequency (RF) calibration of electronic devices in the wireless communication systems.

BACKGROUND

Technological development has led to a boom in the communication device market. In wireless communication systems, communication devices such as mobile phones, wireless Personal Digital Assistants (PDAs), Wi-Fi-enabled laptops, Bluetooth headsets, Radio Frequency Identifier (RFID) tags, wireless medical devices, ZigBee sensors, Internet of Things (IoT) devices, and the like, are being used extensively for a multitude of applications. These communication devices include components such as RF Integrated Circuits (RFICs) used in Modulator-Demodulators (MO-DEMS), Bluetooth, Wi-Fi, and Global Positioning System (GPS) circuits for communication and processing of signals in the RF spectrum.

Extended aging test results reveal that electrical characteristics of components such as RFICs drift from their designed values due to various external factors such as stress, temperature and so on. Similarly, various internal factors such as transient currents, electromigration, device aging, and the like, also contribute to drifting of electrical characteristics. Drifting of electrical characteristics may result in reduced RF functionality and eventually may contribute to device performance degradation. To handle minor drifts in electrical characteristics, the communication devices are provided with factory estimated calibration data (error compensation data) during an initial factory calibration process. However, this error compensation data may no longer be accurate when the drifting of electrical characteristics of RF components of the communication devices increases due to various factors such as aging effects.

Thus, recalibration of the communication devices may be desired so as to maintain device performance. Currently, such recalibration can be performed with assistance from factory signal generators available at the factory or at service centers. Here, the communication device (also referred to as a Device Under Test (DUT)) is directly connected with a factory signal generator (i.e., Agilient, CM W500) to retune the communication device and bring it back to a calibrated state. Thus, with current methods of recalibration the communication devices are transported to the factory or service centers. In addition, the communication devices are connected with external equipment to diagnose whether they require recalibration. Further, such diagnostics are performed at set times and seamless monitoring is currently unavailable.

Furthermore, in scenarios where the communication devices to be recalibrated are deployed on site at remote locations, the current recalibration methods described above are not practical. By bringing the communication devices to the factory from the deployment sites, they no longer fulfill the purpose for which they were deployed at the remote locations. Communication devices such as IoT devices are expected to operate flawlessly on site for relatively long periods (i.e., up to a decade or longer). Alternatively, the IoT devices may be recalibrated on site. However, carrying a factory signal generator to the deployed locations may not be a practical option either given that the communication devices may be deployed in locations and conditions that are difficult to reach. Thus, maintaining the communication devices in a calibrated state to ensure device performance remains a challenge in many practical situations.

SUMMARY OF THE INVENTION

In view of the foregoing, example embodiments herein provide methods for wireless re-calibration of Radio Frequency (RF) components of a communication device. The methods include monitoring a current value of at least one parameter of at least one RF component of a communication device. Further, the methods include communicating the current value of the at least one parameter to a calibration server on detection of an event related to the at least one parameter. Further, the methods include receiving a calibration value for the at least one parameter from the calibration server for initiating a re-calibration procedure. Furthermore, the methods include re-calibrating the current value of the at least one parameter to the calibration value in accordance with the recalibration procedure.

Example embodiments further disclose communication devices including a processor, a memory communicatively coupled to the processor, at least one RF component, and a calibration unit module stored in the memory. The calibration unit module, when executed by the processor, is configured to monitor a current value of at least one parameter of the at least one RF component. Further, the calibration unit module is configured to communicate the current value of the at least one parameter to a calibration server on detection of an event related to the at least one parameter. Further, the calibration unit module is configured to receive a calibration value for the at least one parameter from the calibration server for initiating a re-calibration procedure. Furthermore, the calibration unit is configured to re-calibrate the current value of the at least one parameter to the calibration value in accordance with the recalibration procedure.

Example embodiments further disclose calibration servers for wireless re-calibration of Radio Frequency (RF) components of a communication device. The calibration server includes a processor, a memory communicatively coupled to the processor, and a calibration and analyzer unit module stored in the memory. The calibration and analyzer unit module, when executed by the processor, is configured to receive a current value of at least one parameter of at least one RF component of a communication device. Further, the calibration and analyzer unit module is configured to analyze the received current value to determine a calibration value for the at least one parameter. Furthermore, the calibration and analyzer unit module is configured to communicate the calibration value of the at least one parameter to the communication device for re-calibrating the current value to the calibration value.

Example embodiments further disclose methods including receiving a current value of at least one parameter of at least one RF component of a communication device. The methods further include analyzing the received current value to determine a calibration value for the at least one parameter. Furthermore, the methods include communicating the calibration value of the at least one parameter to the communication device for re-calibrating the current value to the calibration value.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

The example embodiments of this invention are illustrated in the accompanying drawings, throughout which similar reference numbers indicate corresponding parts in the various figures. The example embodiments herein will be better understood from the following description with reference to the drawings, in which.

DETAILED DESCRIPTION OF INVENTION

Figure 1:
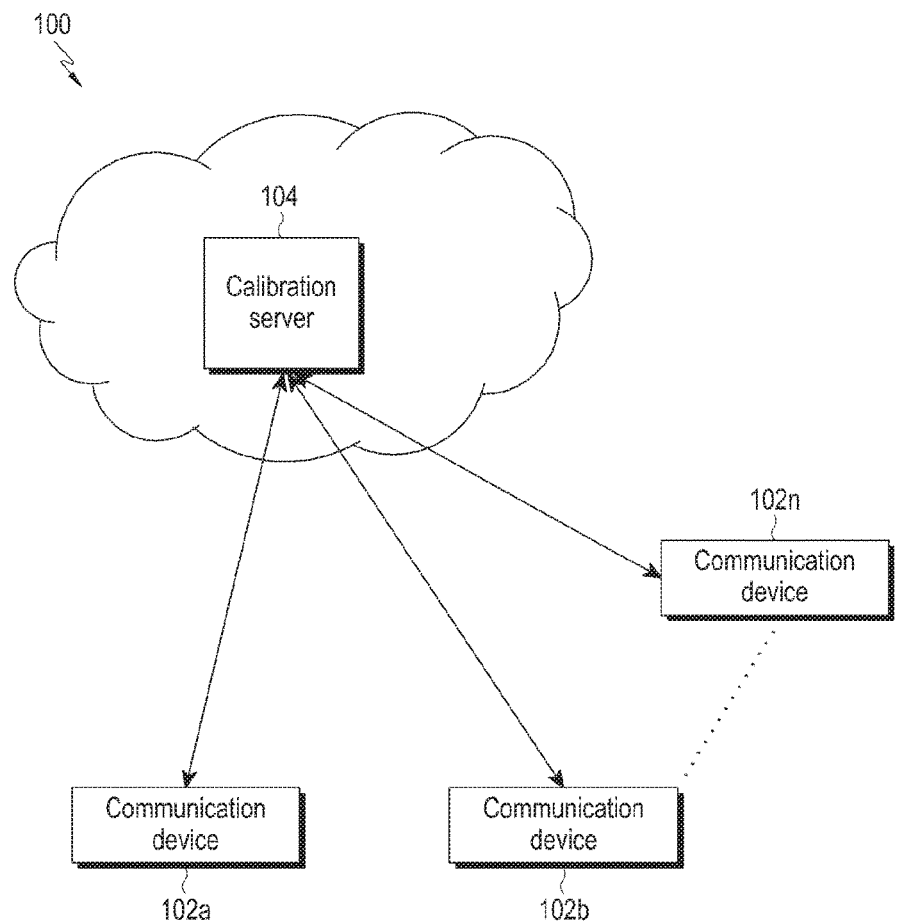
FIG. 1 illustrates an example wireless communication system for wireless re-calibration of communication devices, according to example embodiments.

Example embodiments herein and the various features and details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The examples used herein are intended merely to facilitate an understanding of ways in which the example embodiments herein may be practiced and to further enable those skilled in the art to practice the example embodiments herein. Accordingly, the examples should not be construed as limiting the scope of the example embodiments herein.

The example embodiments herein achieve methods and wireless communication systems for wireless re-calibration of Radio Frequency (RF) components of communication devices. Methods include monitoring, by a communication device, a current value of at least one parameter of at least one RF component of the communication device. Further, the methods include communicating the current value of the at least one parameter to a calibration server on detection of an event related to the at least one parameter. The current value of the at least one parameter, received by the calibration server, is analyzed by the calibration server to determine a calibration value, wherein the calibration server may be configured to communicate the calibration value to the communication device. Further, the methods include receiving, by the communication device, the calibration value for the at least one parameter from the calibration server for initiating a re-calibration procedure. Further, the methods include re-calibrating the current value of the at least one parameter of the communication device to the calibration value in accordance with the recalibration procedure.

The methods proposed improve RF device performance of the communication device in spite of device aging and environmental factors. The methods also enable on-the-fly wireless calibration of RF components of the communication device so that the communication device need not be taken to a factory or service center for re-calibration and is able to function seamlessly when deployed on-site. Effectively, the recalibration methods proposed is cost effective and enhances user experience as the communication device's hardware (HW) is consistently calibrated for performance.

The methods assist in improving factory processes by aggregating and analyzing data corresponding to how devices perform in the field, thereby improving device HW performance of future chipsets. Analysis of recalibration data gathered during recalibration procedures may serve as a significant resource for understanding component behavior and modeling analog device behavior. The results of which may be useful for enhancing factory manufacturing processes.

In example embodiments, the communication device may be a mobile phone, a smart phone, a laptop, a palmtop, a desktop computer, a wearable computing device, a tablet, a wireless medical device, a ZigBee sensor, an Internet of Things (IoT) device, or any User Equipment (UE) that may be configured for wireless re-calibration of local RF components.

In example embodiments, the calibration server may be any server such as a cloud server configured to perform functions of the calibration server.

Referring now to the drawings, and more particularly to FIGS. 1 through 7, where similar reference characters denote corresponding features consistently throughout the figures, there are shown example embodiments.

FIG. 1 illustrates an example wireless communication system 100 for wireless re-calibration of communication devices, according to example embodiments. FIG. 1 depicts wireless communication system 100 including a calibration server 104 configured to wirelessly re-calibrate a plurality of communication devices such as communication device 102a through communication device 102n. Wireless communication system 100, as described, does not require transporting the communication devices to a re-calibration center; rather they are re-calibrated on-site while in operation.

Once communication devices 102a through 102n are deployed on site, each of the communication devices, for example, communication device 102a, that includes a calibration unit for performing RF Parameter Tracking (RFPT), may be configured to monitor the current value of at least one parameter of at least one RF component of the communication device. Further, the communication device may be configured to communicate the current value of the at least one parameter to the calibration server 104 upon detection of an event related to the at least one parameter.

In example embodiments, the event includes detection of the current value of the at least one parameter crossing a predefined threshold value set for the at least one parameter and/or detection of a hardware defect associated with the current value of the at least one parameter.

For example, the communication device may be configured to periodically track the below mentioned metric point values which are uploaded to calibration server 104 for RF component behavior analysis:
a. Multiple retransmissions to access a network (Random Access Channel (RACH)) by the communication device (also referred to as a Device Under Test (DUT)).
b. Temperature profile in association with a state of the DUT (idle, sleep, connected, power ON, and the like.
c. Transient high currents during transmission at a Transmitter (Tx) of the DUT.
d. Battery recharge cycles in the case of battery operated DUTs.
e. Calibration data corruption due to Application Processor and Communication Processor (AP/CP) updates, and so on.

Communication device 102a may also be configured to monitor RF specific parameters like gain used, Phase Lock Loop (PLL), Automatic Frequency Control (AFC) Digital to Analog Converter (DAC) voltages, Receiver (Rx)/Tx powers, Power Amplifier (PA) gain modes, frequency errors, and so on, which help in determining RF component behavior. Communication device 102a may be configured to actively accumulate a current value of at least one of the above mentioned RF parameters and transmit it to calibration server 104.

Calibration server 104 includes a calibration and analyzer unit for performing RF Data Analysis (RFDA). Once the current value of the at least one parameter of the at least one RF component is communicated to calibration server 104, the calibration and analyzer unit may be configured to compare the current value of the at least one parameter with factory calibration data stored in calibration server 104 for the at least one parameter.

The factory calibration data may be pushed to calibration server 104 during the device manufacturing process from the factory. When communication device 102a is manufactured, it is put through a factory calibration procedure. During the factory calibration procedure, a known reference signal is used to estimate the factory calibration data, providing a calibration value for each parameter associated with each RF component of communication device 102a that is stored in a static memory (for example, a Non Volatile Memory (NVM)) of communication device 102a. Further, a backup version of the factory calibration data from every factory calibrated communication device (such as communication device 102a, communication device 102b, and the like) is stored on calibration server 104. Along with calibration values for each of the parameters of the one or more RF components, a threshold may be derived for various metric points of RF components belonging to same device type.

Further, once calibration server 104 compares the current value of the at least one parameter, received from communication device 102a, with the factory calibration data, calibration server 104 may be configured to determine the calibration value for the at least one parameter by computing a minimum value (Min), a maximum value (Max) and a variance of the current value, with respect to the factory calibration data of the at least one parameter.

Calibration server 104, including the calibration and analyzer unit, may be configured to intelligently handle and derive conclusions from data (such as a current parameter value of one or more RF components) received from the calibration unit of communication device 102a. Calibration server 104 with assistance from the calibration and analyzer unit may be configured to correlate RF parameter statistics with factory data and data received from communication device 102a to arrive at re-calibrated values (calibration values) for a given component of a given communication device through interpolation/extrapolation techniques.

Thus, calibration server 104 and communication device 102a work in conjunction to investigate RF characteristics and decide which components/paths in communication device 102a to re-calibrate.

Thus, a current value of the at least one parameter, received by calibration server 104, is analyzed by the calibration and analyzer unit of calibration server 104 to determine a calibration value, wherein calibration server 104a may be configured to communicate the calibration value to communication device 102a. Once communication device 102a receives the calibration value, the calibration unit of communication device 102a may be configured to initiate are-calibration procedure. Communication device 102a may be configured to recalibrate the current value to the calibration value in accordance with the recalibration procedure. After recalibration, communication device 102a may perform communications using the recalibrated RF component(s).

Once the device/component is marked for re-calibration (re-tuning), one, all, or a combination of the below mentioned approaches may be used for RF re-calibration to render data correction. The approaches are also explained in conjunction with FIGS. 6A-C and 7.
a. Reloading an original, back up version of RF calibration data into the communication device (device) (this approach may be used only when complete/partial calibration data is erased due to an AP/CP update).
b. Calibration server based RF re-calibration for closed loop RF paths in a RF transceiver.
c. Determining enhanced re-calibration values based on factory data aggregation and analysis.
d. Performing re-calibration based on the usage of another communication device as a reference signal generator for the re-calibration, wherein the other communication device, such as communication device 102b, is a pre-calibrated device.

Figure 2:
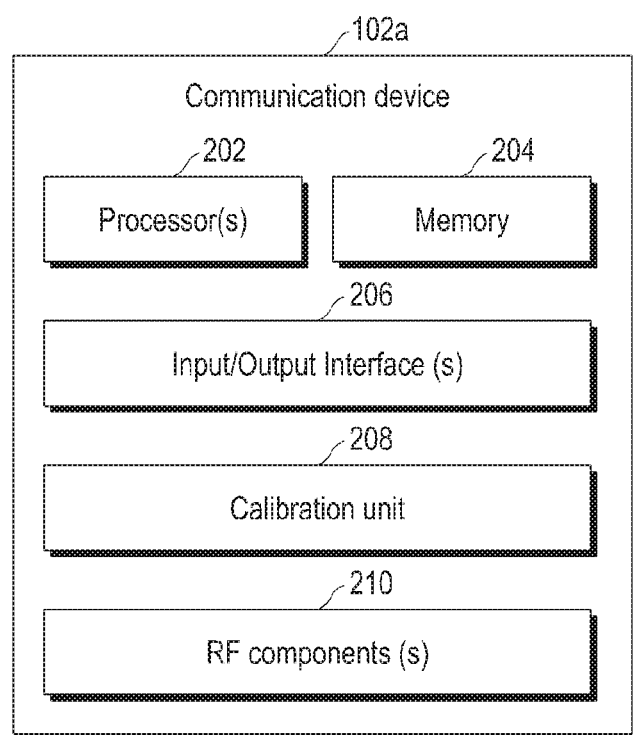
FIG. 2 illustrates a plurality of components of a communication device, according to example embodiments.

FIG. 2 illustrates a plurality of components of a communication device 102a, according to example embodiments. Referring to FIG. 2, communication device 102a is illustrated in accordance with example embodiments of the present subject matter. In example embodiments, communication device 102a may include a processor(s) 202, an input/output (I/O) interface(s) 206, and a memory 204. I/O interface(s) 206 may include, for example, a web interface, a graphical user interface, and the like. Further, I/O interface(s) 206 includes a communication interface to communicate with other wired/wireless systems and devices of wireless communication system 100 such as calibration server 104, communication device 102*b*, communication device 102*c*, and the like.

The communication interface may utilize one or more RF components 210 (for example, RFICs). The communication maybe carried over a Wi-Fi interface, a cellular interface, device to device (D2D) communication, and the like. Further, communication device 102*a* includes a calibration unit 208 that may be configured to monitor the current value of at least one parameter of at least one RF component 210 of the communication device and communicate the current value of the at least one parameter to calibration server 104, via the communication interface, on detection of an event related to the at least one parameter. The current value of the at least one parameter, once received by calibration server 104, is analyzed by calibration server 104 to determine a calibration value, wherein calibration server 104 may be configured to communicate the calibration value to communication device 102*a*. Further, calibration unit 208 may be configured to receive, via the communication interface, the calibration value for the at least one parameter from calibration server 104. Calibration unit 208 then initiates a re-calibration procedure and re-calibrates the current value of the at least one parameter to the calibration value in accordance with the recalibration procedure. In example embodiments, calibration unit 208 is a software module stored in memory 204 and executed by processor 202 to perform functions such as the above.

The recalibration procedure may be based on one or more methods, as explained in conjunction with FIG. 1. In example embodiments, the re-calibration procedure is based on a closed loop path, wherein the at least one RF component 210 undergoing recalibration for the at least one parameter includes the closed loop path.

In example embodiments, the re-calibration procedure is based on usage of statistical analysis, wherein the at least one RF component 210 undergoing recalibration for the at least one parameter does not include a closed loop path.

In example embodiments, the re-calibration procedure is based on usage of another communication device as a reference signal generator for the re-calibration, wherein the other communication device, such as communication device 102*b* is a pre-calibrated device.

Further, the recalibration procedure is explained in conjunction with FIGS. 6A-C and 7.

Figure 3:
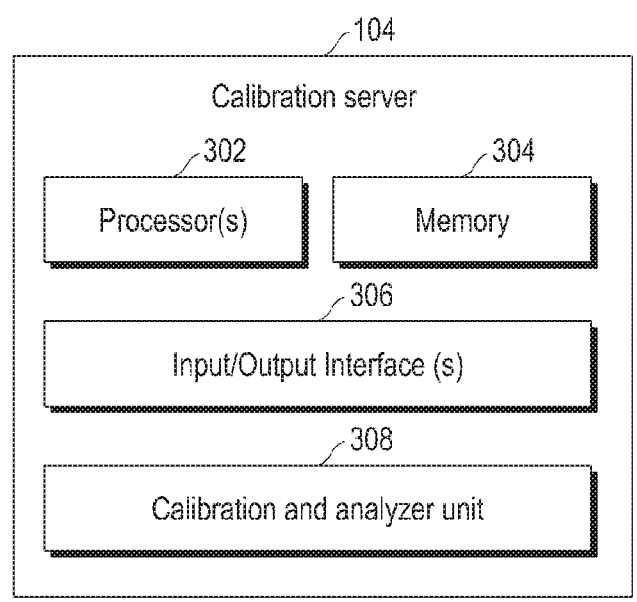
FIG. 3 illustrates a plurality of components of a calibration server for the wireless re-calibration of communication devices, according to example embodiments.

FIG. 3 illustrates a plurality of components of a calibration server 104 for the wireless re-calibration of communication devices (102*a*, 102*b* through 102*n*), according to example embodiments. Referring to FIG. 3, calibration server 104 is illustrated in accordance with example embodiments of the present subject matter. In example embodiments, calibration server 104 may include a processor(s) 302, an input/output (I/O) interface(s) 306, and a memory 304. I/O interface(s) 306 may include, for example, a web interface, a graphical user interface, and the like. Further, I/O interface 306 includes a communication interface to communicate with other wired/wireless systems and devices of wireless communication system 100 such as communication devices 102*b* through 102*n*, and the like. The communication may be carried over a Wi-Fi interface, a cellular interface, device to device (D2D) communication, and the like. Calibration server 104 includes a calibration and analyzer unit 308 that may be configured to receive the current value of the at least one parameter, from communication device 102*a* and analyze the current value to determine a calibration value. Further, calibration server 104 may be configured to communicate the calibration value to communication device 102*a*. In example embodiments, calibration and analyzer unit 308 is a software module stored in memory 304 and executed by processor 302 to perform functions such as the above.

The analysis of the current value performed by calibration and analyzer unit 308 includes comparing the current value of the at least one parameter with factory calibration data stored in the calibration server for the at least one parameter. Further, based on the comparison, determining a calibration value for the at least one parameter by computing a minimum value (Min), a maximum value (Max) and a variance of the current value with respect to the factory calibration data of the at least one parameter. Furthermore, communicating, via the communication interface, the determined calibration value of the at least one parameter to the communication device for re-calibrating the current value to the calibration value.

Figure 4:
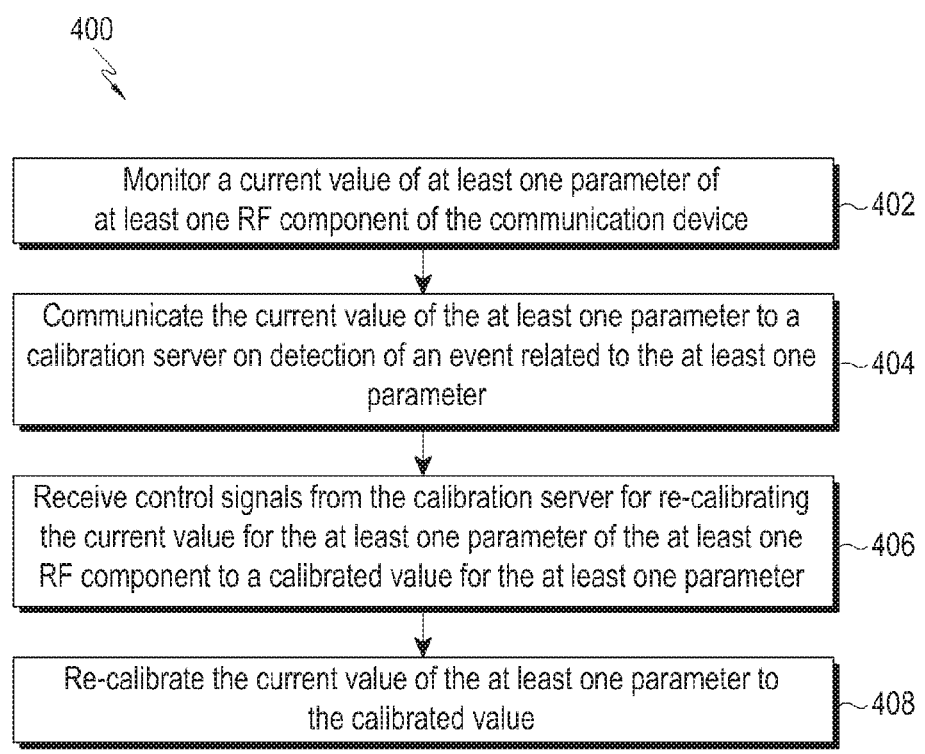
FIG. 4 is a flow diagram illustrating a method, performed at a communication device, for the wireless re-calibration of the communication device, according to example embodiments.

FIG. 4 is a flow diagram illustrating a method 400, performed at a communication device, for the wireless re-calibration of the communication device, according to example embodiments. At operation 402, calibration unit 208 of the communication device 102*a* monitors the current value of at least one parameter of at least one RF component 210 of communication device 102*a*. At operation 404, calibration unit 208 communicates the current value of the at least one parameter to calibration server 104 upon detection of an event related to the at least one parameter. In example embodiments, the event includes at least one of detection of the current value of the at least one parameter crossing a predefined threshold value set for the at least one parameter, and detection of a hardware defect associated with the current value of the at least one parameter.

The current value of the at least one parameter, once received by calibration server 104, is analyzed by calibration server 104 to determine a calibration value, wherein calibration server 104 may be configured to communicate the calibration value to the communication device. At operation 406, calibration unit 208 receives the calibration value for the at least one parameter from calibration server 104. At operation 408, calibration unit 208 re-calibrates the current value of the at least one parameter to the calibration value in accordance with a recalibration procedure. After recalibration, the communication device may perform communication using the recalibrated RF component(s).

The recalibration procedure may be based on one or more methods, as explained in conjunction with FIG. 1, and further explained below.

Figure 6A:
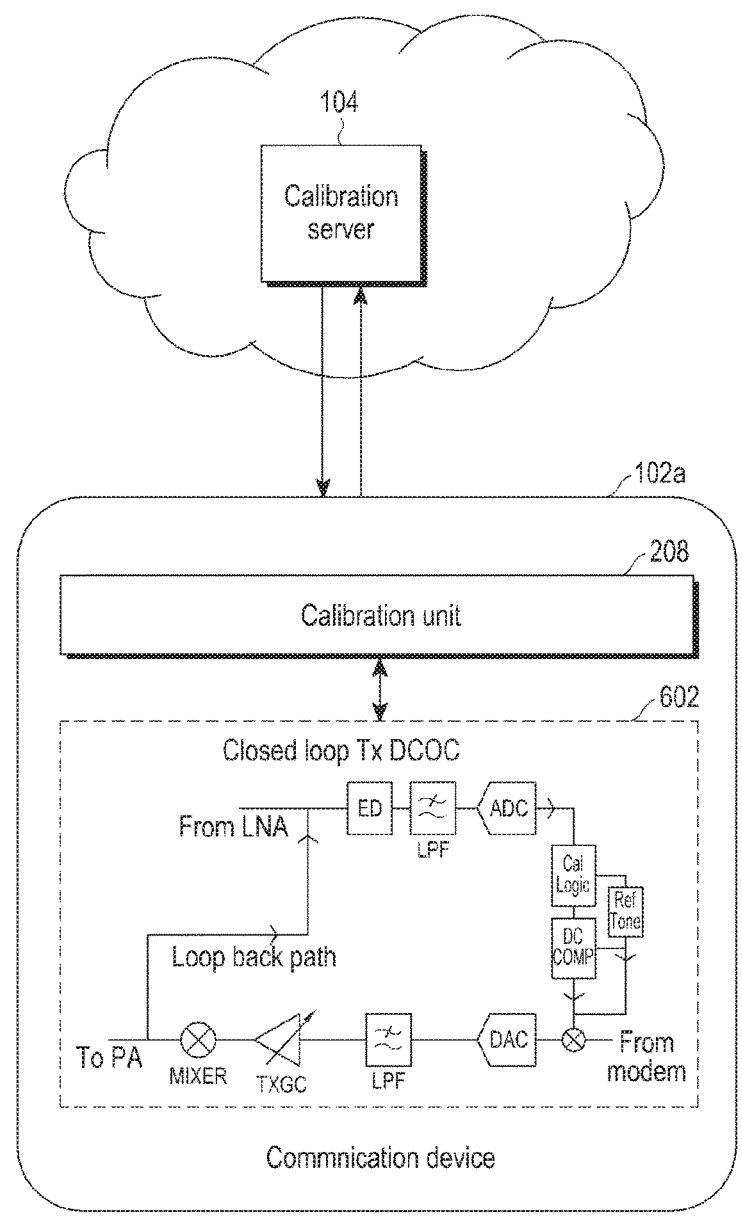
FIGS. 6A, 6B and 6C illustrate example embodiments of a re-calibration process performed at a communication device based on a closed loop path, wherein the at least one RF component undergoing recalibration for the at least one parameter includes the closed loop path, according to example embodiments.
Figure 6B:
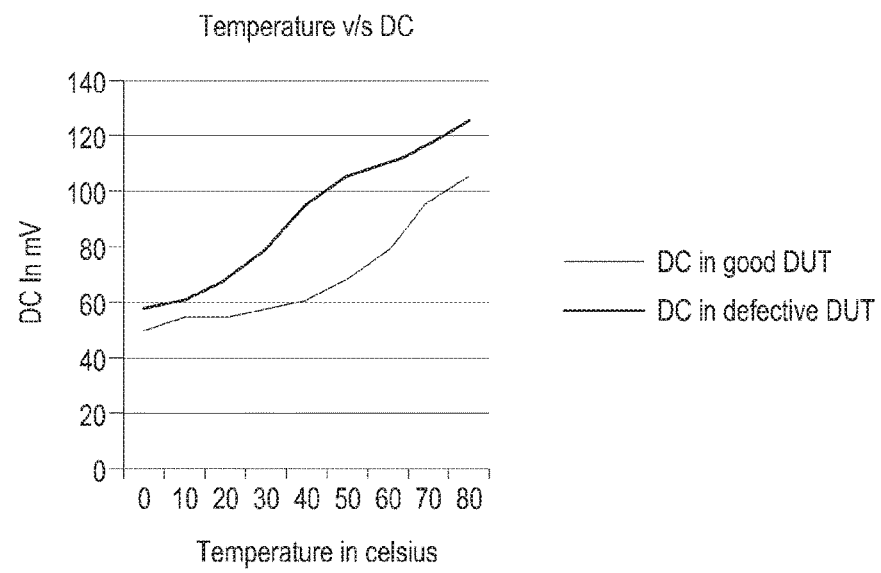
Figure 6C:
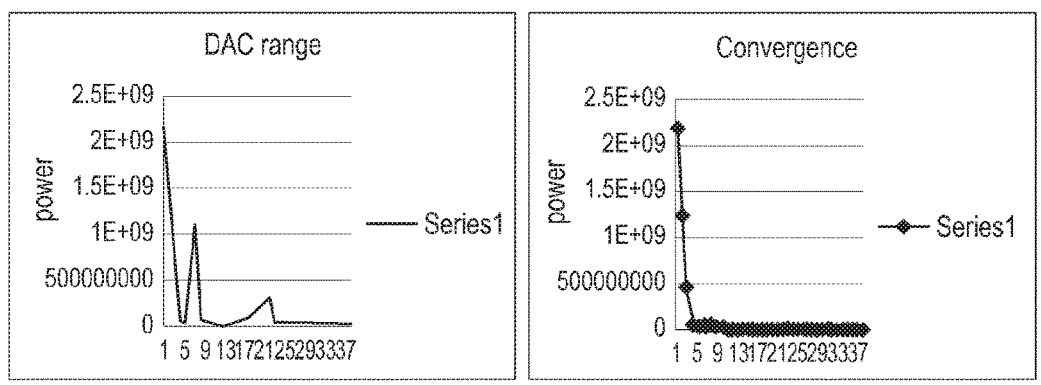

In example embodiments, the re-calibration procedure is based on a closed loop path, wherein the at least one RF component 210 undergoing recalibration for the at least parameter includes the closed loop path, as depicted in FIGS. 6A-C.

Figures 8A, 8B:
FIGS. 8A, 8B and 9 illustrate example tables for use in describing a statistical analysis based re-calibration procedure, according to some example embodiments.

In example embodiments, the re-calibration procedure is based on the usage of statistical analysis, wherein the at least one RF component 210 undergoing recalibration for the at least one parameter does not include a closed loop path. In this statistical analysis based method, in an example herein, calibration server 104 may be configured to store an averaged, refined set of RF calibration data for a given RF transceiver model which is calculated and stored during factory tuning (calibration) procedures. One or more RF transceiver components that are identified for re-tuning or re-calibration, and not re-calibrated using a closed loop path, are considered for re-calibration in this scheme. All key RF parameters are provided to calibration server 104 by calibration unit 208 of communication device 102a. Calibration and analyzer unit 308, at calibration server 104, may be configured to perform RFDA to derive a calibration value based on interpolation/extrapolation of values previously available on calibration server 104 and values provided by calibration unit 208. An example is provided in association with FIGS. 8A and 8B that further describes the statistical analysis based re-calibration procedure.

Where, TX_PWR+TX_PWR COMP=Target_power-X
X=Degradation in RF characteristics.

Figure 9:
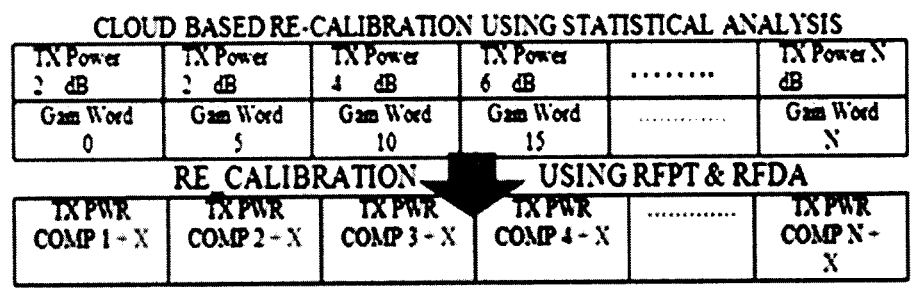

The method allows calibration unit 208 to determine the output power for a gain word and TX compensation and inputs this information onto calibration server 104. Calibration server 104 performs RFDA using this information and derives new compensation tables. This is a new calibration value (calibrated data), which may be pushed over a Wi-Fi channel (or any other communication interface that may be used) and calculated to provide for precise TX output, as depicted in FIG. 9.

Where, TX_PWR+TX_PWR COMP+X=Target_power
X=additional compensation determined by calibration unit 208 and calibration and analyzer unit 308 through RFPT and RFDA respectively.

Figure 7:
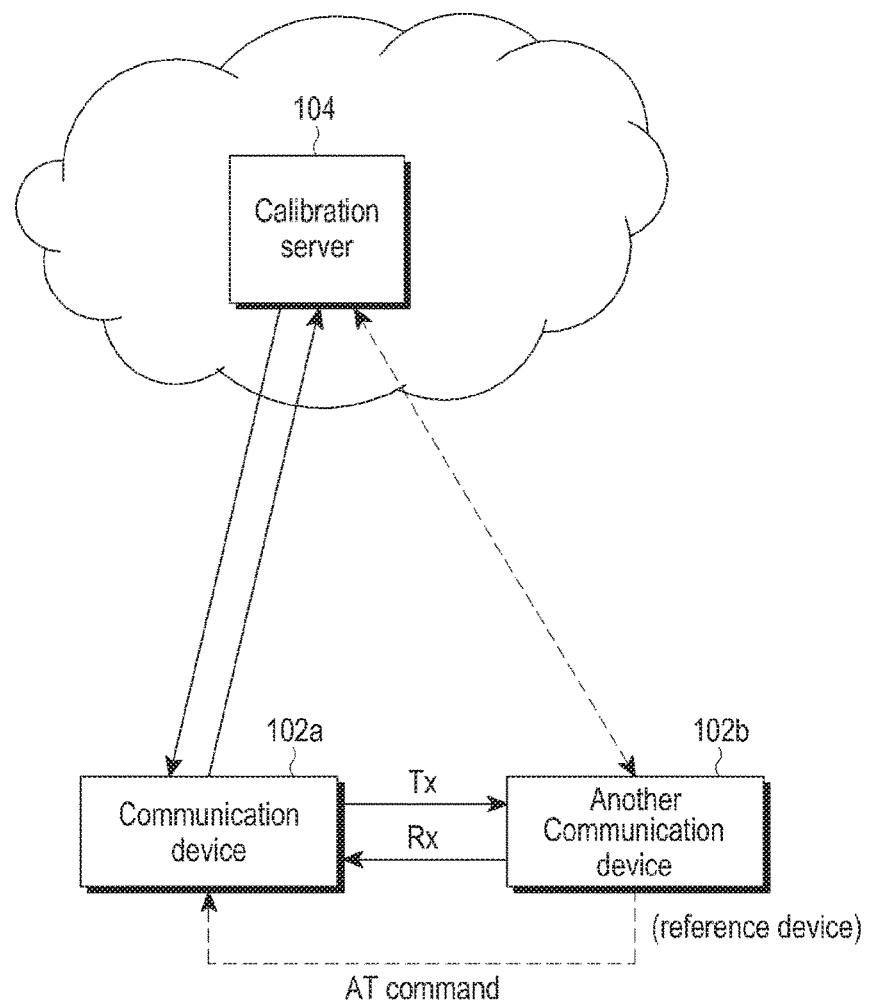
FIG. 7 illustrates an example re-calibration process performed at the communication device based on the usage of another communication device as a reference signal generator for the re-calibration, wherein the other communication device is pre-calibrated, according to example embodiments.

In example embodiments, the re-calibration procedure is based on usage of another communication device as the reference signal generator for the re-calibration, wherein the other communication device, such as communication device 102b, is a pre-calibrated device, as explained in association with FIG. 7.

The various actions, acts, blocks, steps, operations, or the like in method 400 may be performed in the order presented, in a different order or simultaneously. Further, in some example embodiments, some of the actions, acts, blocks, steps, operations, or the like may be omitted, added, modified, skipped, or the like without departing from the scope of the invention.

Figure 5:
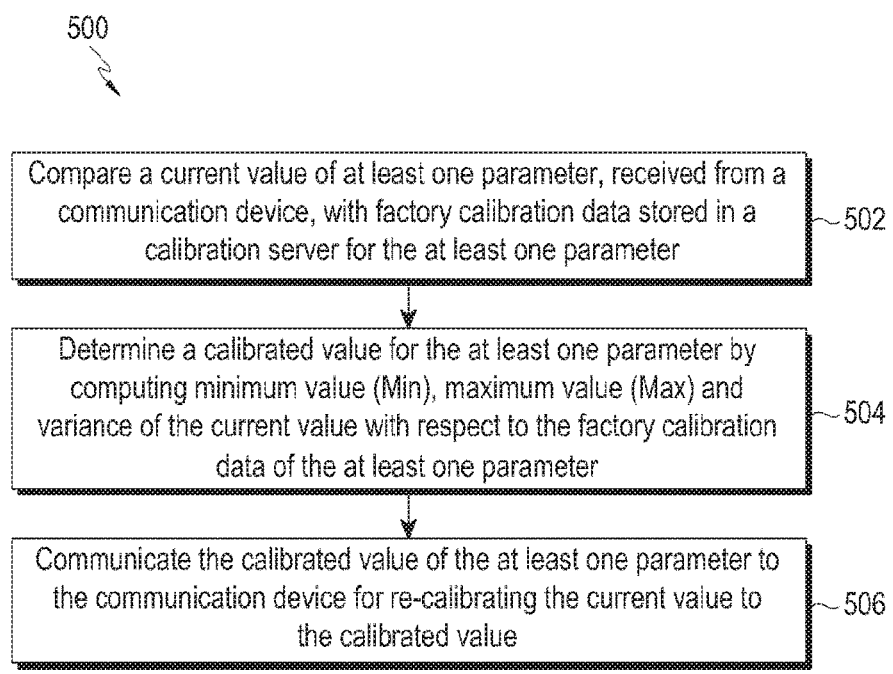
FIG. 5 is a flow diagram illustrating a method, performed at a server, for the wireless re-calibration of a communication device, according to example embodiments.

FIG. 5 is a flow diagram illustrating a method 500, performed at a server, for the wireless re-calibration of a communication device, according to example embodiments. At operation 502, calibration and analyzer unit 308 compares a current value of at least one parameter, received from communication device 102a, with factory calibration data stored in calibration server 104 for the at least one parameter. At operation 504, calibration and analyzer unit 308 determines the calibration value for the at least one parameter by computing a minimum value (Min), a maximum value (Max) and a variance of the current value with respect to the factory calibration data of the at least one parameter. At operation 506, calibration and analyzer unit 308 communicates the calibration value of the at least one parameter to communication device 102a for re-calibration of the current value to the calibration value. The various actions, acts, blocks, steps, operations, or the like in method 500 may be performed in the order presented, in a different order or simultaneously. Further, in some example embodiments, some of the actions, acts, blocks, steps, operations, or the like may be omitted, added, modified, skipped, or the like without departing from the scope of the invention.

FIGS. 6A, 6B and 6C illustrate example embodiments of a re-calibration process performed at the communication device based on a closed loop path, wherein the at least one RF component 210 undergoing recalibration for the at least one parameter includes the closed loop path, according to example embodiments. In example embodiments, the current value of one or more parameters of one or more RF components, here statistical parameters, are monitored and collected by calibration unit 208 and sent to calibration server 104. Calibration and analyzer unit 308 of calibration server 104 analyzes the data and identifies one or more RF components, which are in a closed loop such as TX DC offset calibration 602, which should be re-calibrated.

Upon successful identification, the components in the RF front end of communication device 102a are marked for re-calibration. This re-calibration is carried out when a user least uses the phone (i.e., while asleep) and happens in the background such that the user is unaware of the same. When a specific component in a transceiver is marked for re-tuning by calibration server 104 (based on the RFPT performed in communication device 102a and the RFDA performed in the calibration server) a background calibration command is sent to communication device 102a.

As a result, calibration unit 208 in communication device 102a may be configured to initiate an identified feedback path based calibration process for re-tuning or re-calibration. The whole procedure is repeated until estimated results correspond to values defined in calibration server 104. Upon confirmation of the re-tuned values (calibration values), this calibration data may be over written on top of old calibration data (current values) on communication device 102a, thus updating a Non Volatile Memory (NVM) for the same.

An example of a TX DCOC loop re-calibration is depicted in FIG. 6A, where a DC offset is a function of gain, bandwidth and temperature. When communication device 102a (also referred to as a Device Under Test (DUT)) is affected by various internal and external factors, there is a change in an internal temperature profile of the DUT at a fixed TX gain value. The DC variation with respect to the temperature is as shown in FIG. 6B. If the DC value exceeds a threshold then uplink data transmission may suffer from data saturation. This may result in multiple re-transmissions, resulting in increased power consumption. When communication device 102a is identified as having the wrong DC calibration data at calibration server 104 a background DC calibration procedure is triggered on the DUT (communication device 102a).

FIG. 6C depicts plots corresponding to DAC codes derived during factory calibration. For a given band, a RF Integrated Circuit (RFIC) Tx gain point, and a frequency tone, a DAC code index derived by the DCOC process is 37 according to the present example embodiment (the entire DAC range is swept and DAC codes are calculated).

After communication device 102a is deployed in the field, due to changes in RFIC characteristics and several environmental factors, this DAC code index may shift and may benefit from re-calibration.

Calibration unit 208 on communication device 102a detects this issue by monitoring key RF parameters and transmits the monitored parameters to calibration and analyzer unit 308 on calibration server 104 via Wi-Fi or similar means for communication of the data.

Calibration and analyzer unit 308 of the calibration server analyzes this data and investigates the entire front end chain to identify components for re-tuning. Further, calibration unit 208 issues a re-calibration command, which runs the closed loop DCOC calibration in the background without hampering a user's usage of the communication device.

FIG. 7 illustrates example embodiments of a re-calibration process, performed at the communication device, based on the usage of another communication device as a reference signal generator for the re-calibration, wherein the other communication device is pre-calibrated, according to example embodiments. FIG. 7 depicts communication device 102a (DUT) and another communication device 102b (reference device that is pre-calibrated). Whenever, one or more parameters of one or more components of communication device 102a are identified for calibration by calibration server 104, the calibration server may be configured to signal communication device 102b to provide a signal for the re-calibration of communication device 102a through wireless communication. The signal is generated by communication device 102b using a signal generator within communication device 102b that acts as the reference signal generator for the re-calibration. The RF components of communication device 102b are pre-calibrated The example embodiments disclosed herein may be implemented through at least one software program running on at least one hardware device and performing network management functions to control the network elements of wireless communication system 100. The network elements shown in FIGS. 1-7 include blocks which may be at least one of a hardware device, or a combination of hardware device and software module.

The foregoing description of the example embodiments will so fully reveal the general nature of the example embodiments herein that others can, by applying current knowledge, readily modify and/or adapt for various applications such example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of example embodiments, those skilled in the art will recognize that the example embodiments herein can be practiced with modification within the spirit and scope of the example embodiments as described herein.

What is claimed is:

1. A method for wireless re-calibration of radio frequency (RF) components of a communication device, the method comprising:
    monitoring at least one current value of at least one parameter of at least one RF component of a communication device;
    transmitting the at least one current value of the at least one parameter to a calibration server on detection of an event related to the at least one parameter;
    receiving at least one calibration value for the at least one parameter from the calibration server for initiating a re-calibration procedure, the at least one calibration value being determined based on a minimum value, a maximum value, and a variance of the at least one current value of the at least one parameter; and
    re-calibrating the at least one current value of the at least one parameter to the at least one calibration value in accordance with the re-calibration procedure.

2. The method as claimed in claim 1, wherein detection of the event comprises at least one of detection of the at least one current value of the at least one parameter crossing a defined threshold value, or detection of a hardware defect associated with the at least one current value of the at least one parameter.

3. The method as claimed in claim 1, wherein the re-calibration procedure is performed in accordance with re-calibrating based on a closed loop path, wherein the at least one RF component undergoing recalibration for the at least one parameter comprises the closed loop path.

4. The method as claimed in claim 1, wherein the re-calibration procedure is performed in accordance with re-calibrating using statistical analysis, wherein the at least one RF component undergoing recalibration for the at least one parameter does not comprises a closed loop path.

5. The method as claimed in claim 1, wherein the re-calibration procedure is performed in accordance with re-calibrating using an other communication device as a reference signal generator for re-calibration, wherein the other communication device is a pre-calibrated device.

6. A communication device, comprising:
    at least one radio frequency (RF) component; and
    at least one processor configured to execute computer-readable instructions to,
        monitor at least one current value of at least one parameter of the at least one RF component,
        transmit the at least one current value of the at least one parameter to a calibration server on detection of an event related to the at least one parameter,
        receive at least one calibration value for the at least one parameter from the calibration server for initiating a re-calibration procedure, the at least one calibration value being determined based on a minimum value, a maximum value, and a variance of the at least one current value of the at least one parameter, and
        re-calibrate the at least one current value of the at least one parameter to the at least one calibration value in accordance with the re-calibration procedure.

7. The communication device as claimed in claim 6, wherein the detection of the event comprises at least one of detection of the at least one current value of the at least one parameter crossing a defined threshold value, or detection of a hardware defect associated with the at least one current value of the at least one parameter.

8. The communication device as claimed in claim 6, wherein the re-calibration procedure is performed in accordance with re-calibrating based on a closed loop path, wherein the at least one RF component undergoing recalibration for the at least one parameter comprises the closed loop path.

9. The communication device as claimed in claim 6, wherein the re-calibration procedure is performed in accordance with re-calibrating using statistical analysis, wherein the at least one RF component undergoing recalibration for the at least one parameter does not comprise a closed loop path.

10. The communication device as claimed in claim 6, wherein the re-calibration procedure is performed in accordance with re-calibrating using an other communication device as a reference signal generator for re-calibration, wherein the other communication device is a pre-calibrated device.

11. A calibration server for wireless re-calibration of radio frequency (RF) components of a communication device, comprising:
    a transceiver configured to communicate with the communication device; and
    at least one processor configured to execute computer-readable instructions to,
        receive at least one current value of at least one parameter of at least one RF component of a communication device,
        analyze the received at least one current value to determine at least one calibration value for the at least one parameter, and
        transmit the at least one calibration value to the communication device for re-calibrating the at least one current value to the at least one calibration value, the at least one calibration value being determined based on a minimum value, a maximum value, and a variance of the received at least one current value.

12. The calibration server as claimed in claim 11, wherein the at least one processor is further configured to execute the computer-readable instructions to compare the received at least one current value of the at least one parameter with stored factory calibration data corresponding to the at least one parameter.

13. The calibration server as claimed in claim 12, wherein the at least one processor is further configured to execute the computer-readable instructions to correlate statistics for parameters of RF components with the stored factory calibration data and the received at least one current value using extrapolation or interpolation techniques.

14. The calibration server as claimed in claim 12, wherein the stored factory calibration data is generated using a known reference signal and is pushed to a server, from a manufacturer device, during a device manufacturing process.

15. The calibration server as claimed in claim 11, wherein the at least one processor is further configured to execute the computer-readable instructions to determine the at least one calibration value for the at least one parameter by computing the minimum value, the maximum value and the variance of the received at least one current value with respect to factory calibration data of the at least one parameter.

16. The calibration server as claimed in claim 15, wherein the at least one processor is further configured to execute the computer-readable instructions to transmit the at least one calibration value for the at least one parameter to the communication device for re-calibrating the at least one current value to the at least one calibration value.

17. The calibration server as claimed in claim 11, wherein the at least one processor is configured to execute the computer-readable instructions to communicate an indication of whether the at least one RF component should be recalibrated.

18. The calibration server as claimed in claim 11, wherein the at least one processor is configured to execute the computer-readable instructions to signal a reference device to provide a reference signal for the re-calibration of the communication device through wireless communication.

19. The calibration server as claimed in claim 11, wherein the at least one processor is further configured to execute the computer-readable instructions to repeat the reception, the analysis and the transmission until the at least one current value of the at least one parameter of the at least one RF component falls within a range designated as properly calibrated.

20. The calibration server as claimed in claim 11, wherein the at least one processor is further configured to execute the computer-readable instructions to:
    aggregate aging data corresponding to performance of the at least one RF component of the communication device; and
    transmit the aging data to a manufacturer device.

\* \* \* \* \*